(12) United States Patent
Kuo et al.

(10) Patent No.: US 8,616,750 B2
(45) Date of Patent: Dec. 31, 2013

(54) BACKLIGHT MODULE AND DISPLAY DEVICE USING THE SAME

(75) Inventors: Yi-Cheng Kuo, Taoyuan County (TW); I-Ling Chen, New Taipei (TW)

(73) Assignee: Qisda Corporation, Taoyuan County (TW)

( * ) Notice: Subject to any disclaimer, the term of this patent is extended or adjusted under 35 U.S.C. 154(b) by 170 days.

(21) Appl. No.: 13/225,500

(22) Filed: Sep. 5, 2011

(65) Prior Publication Data

US 2012/0057368 A1 Mar. 8, 2012

(30) Foreign Application Priority Data

Sep. 5, 2010 (CN) .......................... 2010 1 0279840

(51) Int. Cl.
*F21V 7/04* (2006.01)
(52) U.S. Cl.
USPC .......................................... 362/609; 362/612
(58) Field of Classification Search
None
See application file for complete search history.

(56) References Cited

U.S. PATENT DOCUMENTS

| | | | | |
|---|---|---|---|---|
| 7,441,938 | B2 * | 10/2008 | Sakai et al. ................... | 362/634 |
| 2011/0075443 | A1 * | 3/2011 | Huang et al. .................. | 362/606 |

FOREIGN PATENT DOCUMENTS

| | | |
|---|---|---|
| CN | 101726917 A | 6/2010 |
| TW | M350030 | 2/2009 |

OTHER PUBLICATIONS

Office Action of counterpart application by China Patent Office on Feb. 16, 2012.

* cited by examiner

*Primary Examiner* — Britt D Hanley

(57) ABSTRACT

A backlight module including a first casing, a light guiding member, a light source and a limiting structure is provided. The first casing has a top portion and a first side portion connected to the top portion. The light guiding member is located at an inner side of the first side portion and has a light incident surface and a top surface. The light source is located at the inner side of the first side portion and is disposed adjacent to the light guiding member. The light source has a light emitting surface facing the light incident surface. The limiting structure is protruded from a wall below the top portion and located above at least part of the light source and at least part of the top surface of the light guiding member.

19 Claims, 3 Drawing Sheets

BACKLIGHT MODULE AND DISPLAY DEVICE USING THE SAME

This application claims the benefit of People's Republic of China application Serial No. 201010279840.8, filed Sep. 5, 2010, the subject matter of which is incorporated herein by reference.

BACKGROUND OF THE INVENTION

1. Field of the Invention

The invention relates in general to a backlight module and a display device using the same, and more particularly to a backlight module with a light guiding member and a display device using the same.

2. Description of the Related Art

Along with the development in display technology, a flat display has been widely used in a variety of electronic devices as result of the features of lightweight, slimness and compactness. In general, the flat display includes a display panel and a backlight module. The backlight module includes a light source, a light guide plate and a plurality of optical films. The light generated by the light source is guided to the optical film through the light guide plate, so that the light is provided for the display panel disposed on the backlight module. In the disposition of the light source and the light guide plate, if the light generated by the light source cannot be precisely emitted into the light guide plate, dimmed part may occur to the frame generated by the display panel.

In general, when the light source of the backlight module is realized by a lamp tube, the tube-type backlight module further includes a mask. Since the mask is correspondingly fixed the light guide plate and the light source, and the mask is fixed on an iron member of the display, the occurrence that the light cannot be emitted into the light guide plate can be reduced. In comparison, when the light source of the backlight module is realized by a light emitting diode (LED), the light source and the light guide plate cannot be fixed through the mask due to the structural difference. Once the light guide plate is moved (due to warpage for example), a part of the light cannot be emitted into the light guide plate, so that the luminance is decreased.

For example, during the manufacturing process of the light guide plate, the light guide plate is baked after the printing process. However, during the baking process, the edge of the light guide plate may be warped, so that the light emitting surface of the LED cannot be precisely aligned with the light incident surface of the light guide plate. Thus, the light generated by the LED cannot be precisely emitted into the light guide plate. Moreover, due to the assembly tolerance, temperature change or humidity change, the light generated by the LED cannot be precisely aligned with the light guide plate, so that the projection path of the light generated by the LED biased. Therefore, how to provide a backlight module capable of precisely projecting the LED light into the light guide plate has become a prominent task for the industries.

SUMMARY OF THE INVENTION

The invention is directed to a backlight module and a display device using the same. Through the disposition of a limiting structure or a reflective layer, a light source can be precisely aligned with a light guiding member for effectively increasing the utilization rate of the light and the display quality.

According to the present invention, a backlight module including a first casing, a light guiding member, a light source and a limiting structure is provided. The first casing has a top portion and a first side portion connected to the top portion. The light guiding member is located at an inner side of the first side portion and has a light incident surface and a top surface. The light source is located at the inner side of the first side portion and disposed adjacent to the light guiding member. The light source has a light emitting surface facing the light incident surface. The limiting structure is protruded from a wall below the top portion and located above at least part of the light source and at least part of the top surface of the light guiding member.

According to the present invention, a display device including a casing, a display panel and a backlight module is further provided. The display panel is disposed inside the casing, and has a display surface. The backlight module is disposed inside the casing, and includes a first casing, a light guiding member, a light source and a limiting structure. The first casing has a top portion and a first side portion connected to the top portion. The light guiding member is located at an inner side of the first side portion, and has a light incident surface and a top surface. The top surface is substantially parallel to the display surface. The light incident surface is substantially perpendicular to the display surface. The light source is located at the inner side of the first side portion, and disposed adjacent to the light guiding member. The light source has a light emitting surface facing the light incident surface. The limiting structure is protruded from a wall below the top portion and located adjacent to and above at least part of the light source and at least part of the top surface of the light guiding member for limiting the relative movement between the light incident surface and the light emitting surface.

According to the present invention, a display device including a casing, a display panel and a backlight module is further provided. The display panel is disposed inside the casing, and has a display surface. The backlight module is disposed inside the casing. The backlight module includes a first casing, a light guiding member, a light source and a reflective layer. The first casing has a top portion and a first side portion connected to the top portion. The light guiding member is located at an inner side of the first side portion, and has a light incident surface and a top surface. The top surface is substantially parallel to the display surface, and the light incident surface is substantially perpendicular to the display surface. The light source is located at the inner side of the first side portion, located below the top portion and disposed adjacent to the light guiding member. The light source has a light emitting surface facing the light incident surface. The reflective layer is disposed above the light source.

The above and other aspects of the invention will become better understood with regard to the following detailed description of the non-limiting embodiment(s). The following description is made with reference to the accompanying drawings.

DETAILED DESCRIPTION OF THE INVENTION

First Embodiment

Figure 1A:
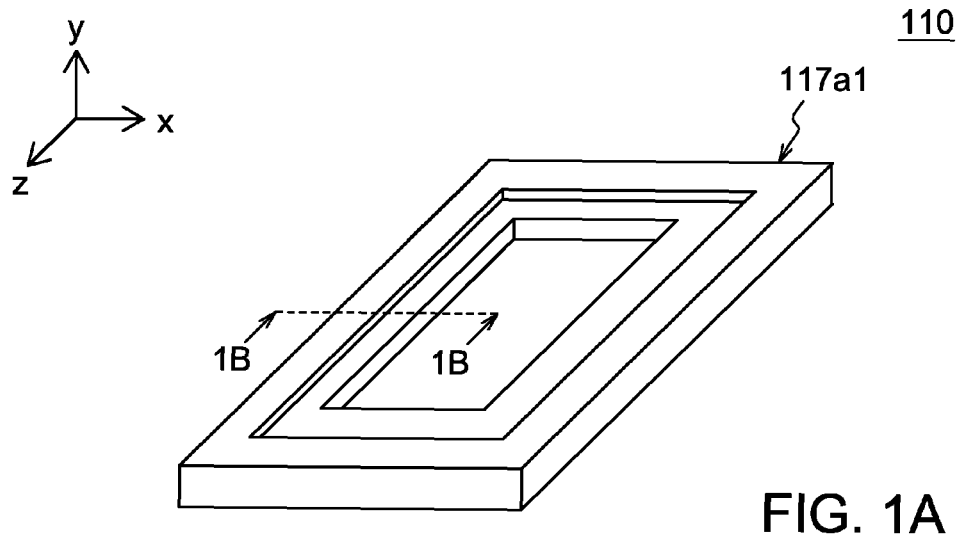
FIG. 1A shows a 3D diagram of a backlight module according to a first embodiment of the invention.
Figure 1B:
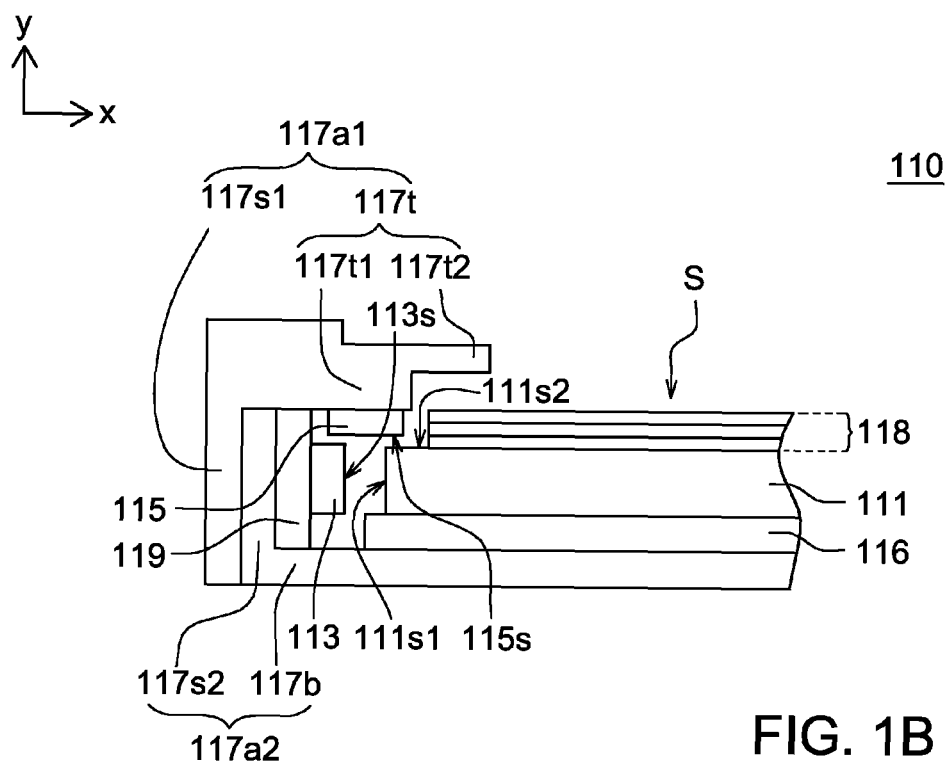
FIG. 1B shows a cross-sectional view of the backlight module along the cross-sectional line 1B-1B in FIG. 1A.

Referring to FIG. 1A and FIG. 1B, a 3D diagram of a backlight module according to a first embodiment of the invention is shown in FIG. 1A, and a cross-sectional view of the backlight module along the cross-sectional line 1B-1B in FIG. 1A is shown in FIG. 1B.

The backlight module 110 includes a light guiding member 111, a light source 113 and a limiting structure 115. The light guiding member 111 has a light incident surface 111s1 and a top surface 111s2. The light source 113 is disposed adjacent to the light guiding member 111, and is realized by light emitting diodes (LEDs), for example. The light source 113 has a light emitting surface 113s facing the light incident surface 111s1. The limiting structure 115 is fixed above at least part of the light source 113 and at least part of the top surface 111s2 of the light guiding member 111 for limiting the relative movement between the light incident surface 111s1 and the light emitting surface 113s in a y-axial direction.

In general, whether the light source 113 can be precisely aligned with the light guiding member 111 greatly affects the utilization rate of the light. For example, when the edges of the light guiding member 111 are warped upwards due to the manufacturing process, temperature or humidity, the limiting structure 115 located above the top surface 111s2 of the light guiding member 111 limits the warpage at the edges of the light guiding member 111. Besides, when the alignment between the light source 113 and the light guiding member 111 is affected due to the tolerance in the assembly of the light source 113, the limiting structure 115 can slightly adjust the position of the light source 113. Thus, the light generated by the light source 113 can be precisely emitted into the light guiding member 111, so that the utilization rate of the light is increased and the display quality is improved.

The detailed descriptions of the backlight module 110 of the present embodiment of the invention are further disclosed below. The light guiding member 111, the light source 113 and the limiting structure 115 are disposed at the casing assembly of the backlight module 110 in FIG. 1B. Anyone who is skilled in the technology of the invention will understand that the form of the casing assembly is not limited to the exemplification in the present disclosure.

The backlight module 110 further includes a reflective member 116, several optical films 118 and a circuit board 119. The casing assembly has an accommodating space S for receiving the light guiding member 111, the reflective member 116 and the optical films 118. The limiting structure 115 is fixed at the casing assembly. The circuit board 119 is disposed on an inner side wall of the casing assembly, and the light source 113 is disposed on the circuit board 119.

In the present embodiment of the invention, the casing assembly includes a first casing 117a1 and a second casing 117a2. The first casing 117a1 has a top portion 117t and a first side portion 117s1, and the first side portion 117s1 is connected to the top portion 117t. The second casing 117a2 has a bottom portion 117b and a second side portion 117s2, and the second side portion 117s2 is connected to the bottom portion 117b. The first side portion 117s1 is disposed outside the second side portion 117s2, and the top portion 117t is disposed on the second side portion 117s2, so that the top portion 117t and the bottom portion 117b are separately disposed to form the accommodating space S for receiving the light guiding member 111, the light source 113, the reflective member 116, the optical films 118 and the circuit board 119.

The optical films 118, the light guiding member 111 and the reflective member 116 are disposed on the bottom portion 117b. The optical films 118, the light guiding member 111 and the reflective member 116 are located at the inner sides of the first side portion 117s1 and the second side portion 117s2. The circuit board 119 is disposed on an inner side wall of the second side portion 117s2, so that the light source 113 disposed on the circuit board 119 is located below the top portion 117t and also located at the inner sides of the first side portion 117s1 and the second side portion 117s2. The limiting structure 115 is protruded from a wall below the top portion 117t. That is, the limiting structure 115 is protruded from the wall below the top portion 117t towards the bottom portion 117b so as to be fixed above at least part of the light source 113 and at least part of the top surface 111s2 of the light guiding member 111. In addition, the limiting structure 115 has a plane, that is, a bottom surface 115s of the limiting structure 115. The plane is located above at least part of the light source 113 and at least part of the top surface 111s2 of the light guiding member 111. Thus, the plane of the limiting structure 115 limits the relative movement between the light incident surface 111s1 and the light emitting surface 113s in the y-axial direction. That is, despite the light incident surface 111s1 of the light guiding member 111 or the light emitting surface 113s of the light source 113 is displaced due to environmental or manufacturing factors, the plane (the bottom surface 115s) of the limiting structure 115 limits the light incident surface 111s1 and the light emitting surface 113s to be at the same height.

In the present embodiment of the invention, the top portion 117t has a first plate portion 117t1 and a second plate portion 117t2. The bottom of a part of the first plate portion 117t1 has the limiting structure 115, and the bottom of the other part of the first plate portion 117t1 does not have the limiting structure. A space is formed between the first plate portion 117t1 not having the limiting structure 115 and the bottom portion 117b for receiving the circuit board 119 and the second side portion 117s2. Thus, without changing or adjusting the size or dimension of the circuit board 119 and the second side portion 117s2, the light incident surface 111s1 and the light emitting surface 113s can be limited to be at the same height through the limiting structure 115. As the display is getting thinner and thinner, when the height of the circuit board 119 is reduced to the minimum (the height of the circuit board 119 is substantially equal to that of the accommodating space S), a space still exists between the bottom surface of the first plate portion 117t1 and the light guiding member 111 for placing the limiting structure 115 to provide the above advantages.

In the following descriptions, the dimension of the light guiding member 111 is exemplified by 21.5 inches, and the height of the circuit board 119 in the y-axial direction is reduced to 3.3 mm. In general, in a backlight module not equipped with the limiting structure 115 of the present embodiment of the invention, a 0.5 mm interval is formed between the light guide plate and the above casing as a tolerance for the thermal expansion of the light guide plate. However, when the light guide plate is warped due to the thermal expansion, the light guide plate may touch the casing and make the light generated by the light source unable to be precisely emitted into the light guide plate. In comparison, the interval between the light guiding member 111 and the above structure is reduced to be less than 0.5 mm as a result of the disposition of the limiting structure 115. Therefore, despite the light guiding member 111 is warped due to the thermal expansion, the deformation of the light guiding member 111 is reduced as a result of the disposition of the limiting structure 115, and the likelihood of precisely projecting the light of the light source 113 into the light guiding member 111 is correspondingly increased.

In addition, the optical films 118 are located under the second plate portion 117t2, and are separated from the second plate portion 117t2 by an interval. The interval can be used as an accommodating space for the part of the optical films 118 and the light guiding member 111 increased due to the thermal expansion. However, the dimension of the interval needs to be appropriately designed so that when the dimensions of the optical films 118 and the light guiding member 111 are changed due to the temperature change, the second plate portion 117t2 still can limit the displacement of the light guiding member 111 in the y-axial direction through the optical films 118.

Figure 1C:
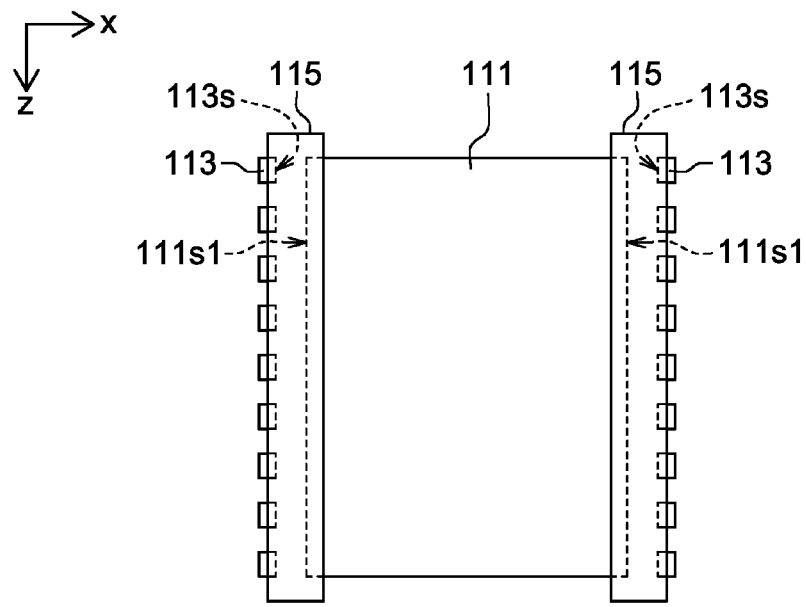
FIG. 1C shows a top view of the limiting structure, the light source and the light guiding member in FIG. 1B.

Referring to FIG. 1C, a top view of the limiting structure, the light source and the light guiding member in FIG. 1B is shown. To highlight the relative locations of the light guiding member 111, the light sources 113 and the limiting structures 115, only the light guiding member 111, the light sources 113 and the limiting structures 115 are illustrated in FIG. 1C. The backlight module 110 of the present embodiment of the invention includes several light sources 113 arranged in two rows along the light incident surfaces 111s1 of the light guiding member 111. The left-hand side limiting structure 115 is correspondingly disposed above the left edge of the light guiding member 111 and the right edges of the light sources 113. The right-hand side limiting structure 115 is correspondingly disposed above the right edge of the light guiding member 111 and the left edges of the light sources 113. The shape of the limiting structure 115 is, for example, strip-shaped for providing the position limiting function. In an embodiment, the backlight module 110 includes several of block-shaped limiting structures respectively disposed above the light guiding member and the light sources 113 for providing the position limiting function. In the present embodiment of the invention, the light sources 113 are arranged in two rows as an exemplification. However, anyone who is skilled in the technology of the invention will understand that the light sources 113 can also be arranged in other forms for providing the light, and the disposition of the limiting structure 115 can also be changed or adjusted according to the disposition of the light sources 113 for providing the position limiting function.

Figure 2:
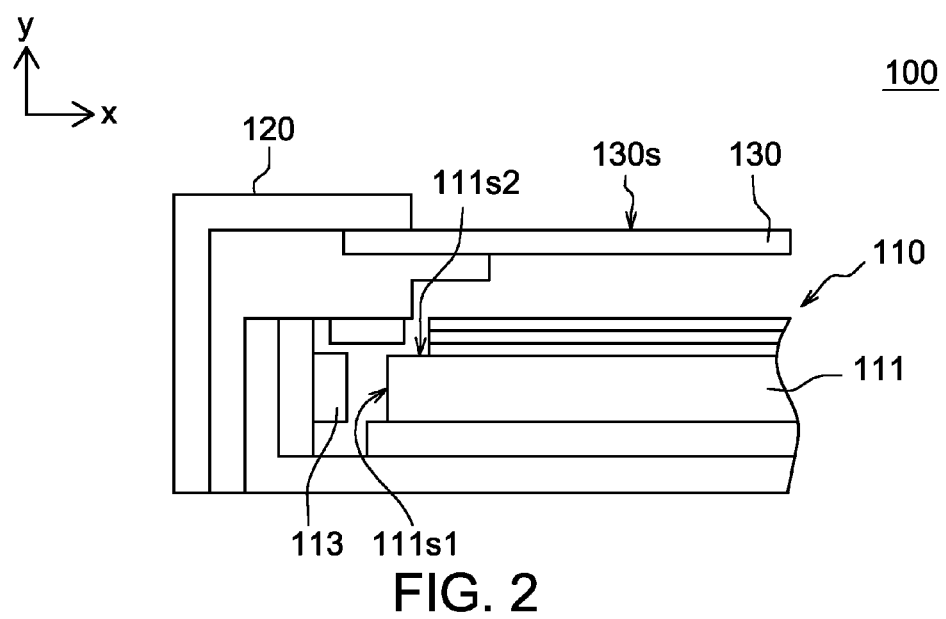
FIG. 2 shows a cross-sectional view of a display device using the backlight module in FIG. 1B.

Referring to FIG. 2, a cross-sectional view of a display device using the backlight module in FIG. 1B is shown. The display device 100 includes the above-mentioned backlight module 110, a casing 120 and a display panel 130. The display panel 130 is disposed inside the casing 120, and has a display surface 130s. The backlight module 110 is disposed inside the casing 120. The top surface 111s2 of the light guiding member 111 of the backlight module 110 is substantially parallel to the display surface 130s, and the light incident surface 111s1 is substantially perpendicular to the display surface 130s. The light source 113 is disposed at a lateral side inside the casing 120. The limiting structure 115 is protruded from the wall below the top portion 117t towards the bottom portion 117b for increasing the precision in the alignment between the light incident surface 111s1 of the light guiding member 111 and the light emitting surface 113s of the light source 113. Therefore, the luminance of the display panel 130 is uniform and the occurrence of dimmed part can be avoided.

Second Embodiment

Figure 3:
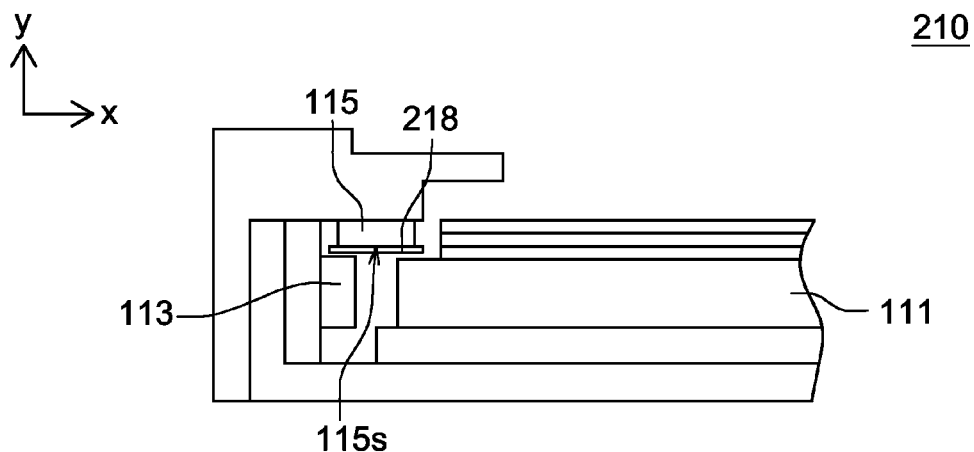
FIG. 3 shows a cross-sectional view of a backlight module according to a second embodiment of the invention.

Referring to FIG. 3, a cross-sectional view of a backlight module according to a second embodiment of the invention is shown. In comparison to the backlight module 110 of the first embodiment, the backlight module 210 of the present embodiment of the invention further includes a reflective layer 218. As for other elements similar to those of the first embodiment, the same designations are used and the similarities are not repeatedly described.

The reflective layer 218 is disposed on the bottom surface 115s of the limiting structure 115. More specifically, the reflective layer 218 is located between the limiting structure 115 and at least part of the light source 113, and between the limiting structure 115 and at least part of the light guiding member 111. Thus, when the backlight module 210 is disposed in the display device, the disposition of the reflective layer 218 increases the luminance by about 5% so as to further reduce dimmed part and improves display quality.

Third Embodiment

Figure 4:
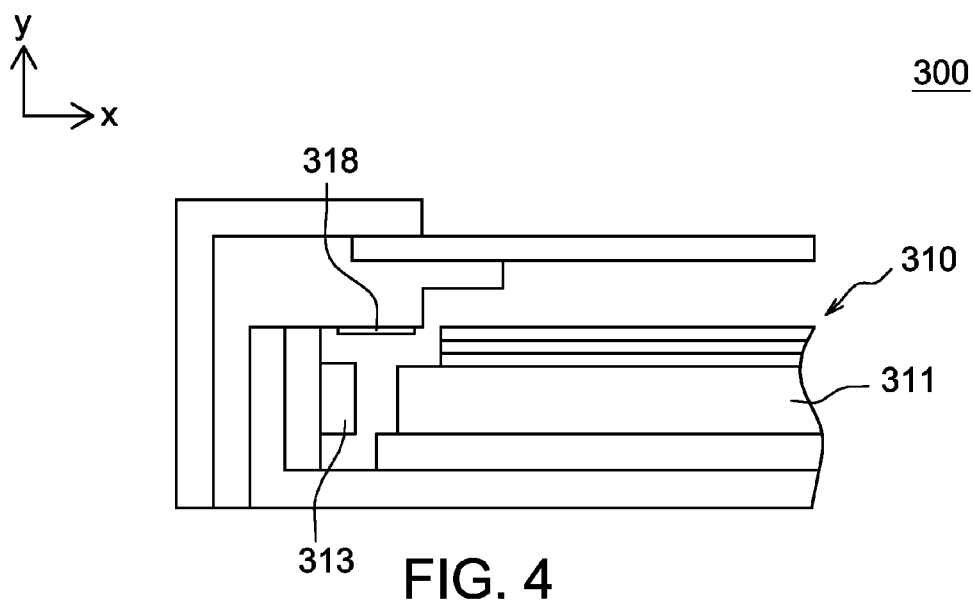
FIG. 4 shows a cross-sectional view of a display device according to a third embodiment of the invention.

Referring to FIG. 4, a cross-sectional view of a display device according to a third embodiment of the invention is shown. In comparison to the backlight module 110 of the first embodiment, the backlight module 310 of the display device 300 of the present embodiment of the invention includes a reflective layer 318. The limiting structure 115 of the first embodiment is replaced with the reflective layer 318. That is, the reflective layer 318 is disposed above the light source 313 and the light guiding member 311 for limiting the relative movement between the light guiding member 311 and the light source 313 in the y-axial direction, and improving the overall luminance. The other elements similar to those of the first embodiment are not repeatedly described.

According to the backlight module and the display device using the same disclosed in the above embodiments of the invention, the limiting structure is disposed above a part of the light source and a part of the light guiding member, so that the light emitting surface of the light source can be precisely aligned with the light incident surface of the light guiding member. Thus, the light generated by the light source can be precisely emitted into the light guiding member so as to increase the utilization rate of the light and improve the display quality. In an embodiment, the reflective layer is disposed on the bottom surface of the limiting structure, so that the utilization rate of the light and the overall luminance are both increased and the display quality is improved further. In the backlight module of another embodiment, only a reflective layer is disposed above a part of the light source and a part of the light guiding member, so that the light emitting surface of the light source can be precisely aligned with the light incident surface of the light guiding member, and the utilization rate of the light and the overall luminance can be increased through the feature of reflecting the light of the reflective layer.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A backlight module, comprising:
 a first casing having a top portion and a first side portion, wherein the first side portion is connected to the top portion;

a light guiding member located at an inner side of the first side portion, wherein the light guiding member has a light incident surface and a top surface;

a circuit board located at the inner side of the first side portion;

a light source located at the inner side of the first side portion and disposed adjacent to the light guiding member, wherein the light source is disposed on the circuit board and has a light emitting surface facing the light incident surface; and a limiting structure protruded along the direction of the height of the circuit board from a wall below the top portion and located above at least part of the light source and at least part of the top surface of the light guiding member so that the limiting structure can limit the light incident surface and the light emitting surface to be at the same height.

2. The backlight module according to claim 1, further comprising:

a second casing having a bottom portion and a second side portion, wherein the second side portion is connected to the bottom portion, the first side portion is disposed outside the second side portion, and the top portion is disposed above the second side portion, so that the top portion and the bottom portion are separately disposed to form an accommodating space, and the light guiding member is disposed on the bottom portion, wherein the circuit board disposed on an inner side wall of the second side portion, the height of the circuit board is substantially equal to that of the accommodating space, and the limiting structure is protruded from the wall below the top portion towards the bottom portion.

3. The backlight module according to claim 1, further comprising:

a reflective layer disposed on a bottom surface of the limiting structure, wherein the reflective layer is located between the limiting structure and at least part of the light source and between the limiting structure and at least part of the light guiding member.

4. The backlight module according to claim 1, wherein the backlight module comprises a plurality of light sources, and the limiting structure is correspondingly disposed above the light sources and has a plane located above at least part of each light source and at least part of the top surface of the light guiding member.

5. A display device, comprising:

a casing;

a display panel disposed inside the casing, wherein the display panel has a display surface; and a backlight module disposed inside the casing, wherein the backlight module comprises:

a first casing having a top portion and a first side portion, wherein the first side portion is connected to the top portion;

a light guiding member located at an inner side of the first side portion, wherein the light guiding member has a light incident surface and a top surface, the top surface is substantially parallel to the display surface, and the light incident surface is substantially perpendicular to the display surface;

a circuit board located at the inner side of the first side portion;

a light source located at the inner side of the first side portion and disposed adjacent to the light guiding member, wherein the light source is disposed on the circuit board and has a light emitting surface facing the light incident surface; and a limiting structure protruded along the direction of the height of the circuit board from a wall below the top portion and located adjacent to and above at least part of the light source and at least part of the top surface of the light guiding member for limiting the relative movement between the light incident surface and the light emitting surface so that the limiting structure can limit the light incident surface and the light emitting surface to be at the same height.

6. The display device according to claim 5, wherein the backlight module further comprises:

a second casing having a bottom portion and a second side portion, wherein the second side portion is connected to the bottom portion, the first side portion is disposed outside the second side portion, and the top portion is disposed above the second side portion, so that the top portion and the bottom portion are separately disposed to form an accommodating space, and the light guiding member is disposed on the bottom portion, wherein the circuit board disposed on an inner side wall of the second side portion, the height of the circuit board is substantially equal to that of the accommodating space, and the limiting structure is protruded from the wall below the top portion towards the bottom portion.

7. The display device according to claim 5, wherein the backlight module further comprises:

a reflective layer disposed on a bottom surface of the limiting structure, wherein the reflective layer is located between the limiting structure and at least part of the light source and between the limiting structure and at least part of the light guiding member.

8. The display device according to claim 5, wherein the backlight module comprises a plurality of light sources, and the limiting structure is correspondingly disposed above the light sources and has a plane located above at least part of each light source and at least part of the top surface of the light guiding member.

9. A display device, comprising:

a casing;

a display panel disposed inside the casing and having a display surface; and a backlight module disposed inside the casing, wherein the backlight module comprises:

a first casing having a top portion and a first side portion, wherein the first side portion is connected to the top portion;

a light guiding member located at an inner side of the first side portion, wherein the light guiding member has a light incident surface and a top surface, the top surface is substantially parallel to the display surface, and the light incident surface is substantially perpendicular to the display surface;

a circuit board located at the inner side of the first side portion;

a light source located at the inner side of the first side portion, located below the top portion and disposed adjacent to the light guiding member, wherein the light source is disposed on the circuit board and has a light emitting surface facing the light incident surface;

a limiting structure protruded along the direction of the height of the circuit board from a wall below the top portion and located above at least part of the light source and at least part of the top surface of the light guiding member so that the limiting structure can limit the light incident surface and the light emitting surface to be at the same height; and a reflective layer, disposed above the light source.

10. The display device according to claim 9, wherein the reflective layer is disposed on a bottom surface of the limiting structure.

11. The display device according to claim 9, wherein the backlight module further comprises:
   a second casing having a bottom portion and a second side portion, wherein the second side portion is connected to the bottom portion, the first side portion is disposed outside the second side portion, and the top portion is disposed above the second side portion, so that the top portion and the bottom portion are separately disposed to form an accommodating space, and the light guiding member is disposed on the bottom portion, wherein the circuit board disposed on an inner side wall of the second side portion, wherein the height of the circuit board is substantially equal to that of the accommodating space, and the reflective layer is protruded from a wall below the top portion towards the bottom portion.

12. The display device according to claim 9, wherein the reflective layer is protruded from a wall below the top portion and is located between the wall below the top portion and at least part of the light source and between the wall below the top portion and at least part of the light guiding member.

13. The display device according to claim 9, wherein the backlight module comprises a plurality of light sources, and the reflective layer is correspondingly disposed above the light sources and has a plane located above at least part of each light source and at least part of the top surface of the light guiding member.

14. The backlight module according to claim 1, wherein the thickness of the light guiding member is substantially the same as the thickness of the light source.

15. The backlight module according to claim 1, wherein the limiting structure can adjust the light source to parallel the light incident surface.

16. The display device according to claim 5, wherein the thickness of the light guiding member is substantially the same as the thickness of the light source.

17. The display device according to claim 5, wherein the limiting structure can adjust the light source to parallel the light incident surface.

18. The display device according to claim 9, wherein the thickness of the light guiding member is substantially the same as the thickness of the light source.

19. The display device according to claim 9, wherein the limiting structure can adjust the light source to parallel the light incident surface.

* * * * *